US009685886B2

(12) United States Patent
Modeer (10) Patent No.: US 9,685,886 B2
(45) Date of Patent: Jun. 20, 2017

(54) PHOTOVOLTAIC DC/AC INVERTER WITH CASCADED H-BRIDGE CONVERTERS (75) Inventor: Tomas Modeer, Stockholm (SE)

(73) Assignee: OPTISTRING TECHNOLOGIES AB, Stockholm (SE)

( * ) Notice: Subject to any disclaimer, the term of this patent is extended or adjusted under 35 U.S.C. 154(b) by 357 days.

(21) Appl. No.: 14/342,381

(22) PCT Filed: Aug. 29, 2012

(86) PCT No.: PCT/EP2012/066782
§ 371 (c)(1),
(2), (4) Date: Jul. 23, 2014

(87) PCT Pub. No.: WO2013/030236
PCT Pub. Date: Mar. 7, 2013

(65) Prior Publication Data
US 2015/0340964 A1 Nov. 26, 2015

Related U.S. Application Data (60) Provisional application No. 61/533,241, filed on Sep. 11, 2011.

(30) Foreign Application Priority Data

Aug. 31, 2011 (SE) ...................................... 1150791

(51) Int. Cl.
*H02M 7/49* (2007.01)
*H02S 40/32* (2014.01)
(Continued)

(52) U.S. Cl.
CPC .............. *H02M 7/49* (2013.01); *H02J 3/383* (2013.01); *H02M 7/5387* (2013.01);
(Continued)

(58) Field of Classification Search
CPC .......... H02M 7/49; H02M 7/5387; H02J 3/38; H02S 40/32
(Continued)

(56) References Cited

U.S. PATENT DOCUMENTS 4,052,657 A    10/1977  Kleiner et al.
5,949,668 A *   9/1999  Schweighofer .... G01R 33/3852
                                                         363/136
(Continued)

FOREIGN PATENT DOCUMENTS

DE    102005045957 A1    11/2001
JP       H01-238434 A     9/1989
(Continued)

OTHER PUBLICATIONS

Samir Kouro, Bin Wu,..Control of a cascaded H-bridge multilevel converter for grid connection of photovoltaic system, 2009 IEEE, pp. 3922-3982.*

(Continued)

*Primary Examiner* — Rexford Barnie
*Assistant Examiner* — Toan Vu
(74) *Attorney, Agent, or Firm* — Volpe and Koenig, P.C.

(57) ABSTRACT

The present invention relates to a DC-AC inverter comprising a plurality of H-bridge converters, each being arranged to be integrated with a respective photovoltaic element and to be supplied with a DC voltage from the photovoltaic element, the H-bridge converters further being cascaded to produce a multilevel voltage output (Vout). The DC-AC inverter further comprises switch control circuitry connected to each one of the plurality of H-bridge converters to control switching thereof for producing the multilevel voltage output, and a central adaptation unit connected to the cascaded (Continued)

H-bridge converter for adapting the multilevel voltage output such that an AC grid voltage is output from the DC-AC inverter.

16 Claims, 6 Drawing Sheets

(51) Int. Cl.
  *H02M 7/5387* (2007.01)
  *H02J 3/38* (2006.01)
(52) U.S. Cl.
  CPC ............. *H02S 40/32* (2014.12); *Y02E 10/563* (2013.01); *Y10T 307/707* (2015.04)
(58) Field of Classification Search
  USPC .......................................................... 307/82
  See application file for complete search history.

(56) References Cited

U.S. PATENT DOCUMENTS

| | | | |
|---|---|---|---|
| 6,111,767 A * | 8/2000 | Handleman | G05F 1/67 136/293 |
| 8,031,495 B2 | 10/2011 | Sachdeva et al. | |
| 2008/0078436 A1 | 4/2008 | Nachamkin et al. | |
| 2010/0116325 A1* | 5/2010 | Nikoonahad | H01L 27/1421 136/251 |
| 2012/0176076 A1* | 7/2012 | Mansfield | H02S 50/10 320/101 |

FOREIGN PATENT DOCUMENTS

| | | |
|---|---|---|
| JP | H11-312022 A | 11/1999 |
| JP | 2001-223377 A | 8/2001 |
| JP | 2010-529826 A | 8/2010 |
| JP | 2011-010505 A | 1/2011 |

OTHER PUBLICATIONS

Alonso et al., "Cascaded H-Bridge Multilevel Converter for Grid Connected Photovoltaic Generators With Independent Maximum Power Point Tracking of Each Solar Array", PESC '03, 2003 IEEE 34th Annual Power Electronics Specialists Conference, Jun. 15-19, 2003.

Beig A R et al., "A Novel Fifteen Level Inverter for Photovoltaic Power Supply System", Industry Applications Conference, 2004, 39th IAS Annual Meeting, Oct. 3-7, 2004.

Abdul Rahiman Beig, Udaya Kumar R.Y. & V.T. Ranganathan, "A Novel Fifteen Level Inverter for Photovoltaic Power Supply System", Industry Applications Conference, IEEE, Oct. 3, 2004, pp. 1165-1171.

Brian Johnson et al: "Photovoltaic AC module composed of a very large number of interleaved inverters", Applied Power Electronics Conference and Exposition (APEC), 2011 Twenty-Sixth Annual IEEE, IEEE, Mar. 6, 2011 (Mar. 6, 2011), pp. 976-981, XP032013997, DOI: 10.11 09/APEC.2011.5744713 ISBN: 978-1-4244-8084-5.

Mohammad Aii Rezaei et al: "Enhancing the reliability of single-phase CHB-based grid-connected photovoltaic energy systems", Power Electronics, Drive Systems and Technologies Conference (PEDSTC), 2011 2nd, IEEE, Feb. 16, 2011 (Feb. 16, 2011), pp. 117-122, XP031936594, DOI: 10.11 09/EDSTC.2011.5742402 ISBN: 978-1-61284-422-0.

* cited by examiner

PHOTOVOLTAIC DC/AC INVERTER WITH CASCADED H-BRIDGE CONVERTERS

CROSS REFERENCE TO RELATED APPLICATIONS

This application is the U.S. National Stage, under 35 U.S.C. §371, of International Application No. PCT/EP2012/066782, filed Aug. 29, 2012, which claims the benefit of U.S. Provisional Application No. 61/533,241, filed Sep. 11, 2011 and Swedish Patent Application No. 1150791-0 filed Aug. 31, 2011, the contents of which are incorporated by reference as if fully set forth herein.

TECHNICAL FIELD

This invention relates to a DC-AC inverter and a photovoltaic system

BACKGROUND

In the art, a number of different DC-AC converter types have been used for connecting photovoltaic (PV) elements, such as solar panels, to existing electrical grids. Examples of prior art converter types for converting DC voltage produced by solar panels into AC voltage are e.g. string converters, power optimizers and microinverters. The respective type of converter is associated with certain advantages and drawbacks. For instance, the string converters have a high conversion efficiency but are poor when it comes to partial shading harvesting, while the power optimizers perform well at partial shading harvesting but are less conversion effective than the string converters and more expensive. Finally, microinverters generally perform well and are versatile but also more expensive than both the string converter and the power optimizer.

A further DC-AC converter that has proven useful in solar panel applications is the cascaded full-bridge converter, also referred to as the cascaded H-bridge converter or chain link converter. The cascaded H-bridge converter consists of a number of full-bridge converters connected in cascade, i.e. in series. A converter fed with a DC voltage $V_{DC}$ is able to produce a 3-level output consisting of the voltage levels $+V_{DC}$, zero and $-V_{DC}$. The output of each converter is added such that a multilevel waveform is formed. A circuit consisting of N cascaded H-bridge converters can produce a voltage waveform with 2N+1 voltage levels, with which it is possible to attain a good approximation of a sine wave. In this particular topology, the DC-supplies of the converters are isolated from each other.

"11-level Cascaded H-bridge Grid-tied Inverter Interface with Solar Panels", by Filho et al, Applied Power Electronics Conference and Exposition (APEC), 2010 Twenty-Fifth Annual IEEE, Issue Date: 21-25 Feb. 2010, discloses the use of a cascaded H-bridge converter in connection to solar panels. A problem with the system disclosed is the power loss which occurs when transporting solar panel energy from the respective solar panel to the corresponding H-bridge converter.

SUMMARY

An object of the present invention is to solve or at least mitigate these problems in the art.

This object is achieved in a first aspect of the present invention by a DC-AC inverter comprising a plurality of H-bridge converters, each being arranged to be integrated with a respective photovoltaic element and to be supplied with a DC voltage from the photovoltaic element, the H-bridge converters further being cascaded to produce a multilevel voltage output. The DC-AC inverter further comprises switch control circuitry connected to each one of the plurality of H-bridge converters to control switching thereof for producing the multilevel voltage output, and a central adaptation unit connected to the cascaded H-bridge converter for adapting the multilevel voltage output such that an AC grid voltage is output from the DC-AC inverter.

The object is achieved in a second aspect of the present invention by a photovoltaic system comprising a plurality of photovoltaic elements and a DC-AC inverter. The DC-AC inverter comprises a plurality of H-bridge converters, each being arranged to be integrated with a respective one of the plurality of photovoltaic elements and to be supplied with a DC voltage from said respective photovoltaic element, the H-bridge converters further being cascaded to produce a multilevel voltage output. The DC-AC inverter further comprises switch control circuitry connected to each one of the plurality of H-bridge converters to control switching thereof for producing said multilevel voltage output, and a central adaptation unit connected to the cascaded H-bridge converter for adapting the multilevel voltage output such that an AC grid voltage is output from the DC-AC inverter.

By integrating the H-bridge converters with the photovoltaic elements, a number of advantages regarding manufacturing and installation are achieved. Further, the need for DC cabling between the PV element, for instance being a solar panel, and its H-bridge converter is eliminated. A major advantage associated with the elimination of DC cabling is increased efficiency, as no power loss occurs between the PV elements and the H-bridge converters. A second major advantage is the cost aspect; DC cabling and connectors (in particular DC rated cables and connectors) are expensive, and a DC-AC inverter integrated with the PV element will result in a substantial decrease in overall cost. A third advantage is the safety aspect; since the DC-AC inverter is integrated with the PV element, and thus no longer connected by lengthy DC cables, the risk of subjecting for example maintenance personnel or fire fighters to electric chock or other electrical hazard is considerably reduced. Further, functionality which in the art has been located at the respective H-bridge converter can be implemented in the central adaptation unit, for instance various control functions and grid compliance circuitry. Moreover, the present invention allows for individual PV panel monitoring. Monitoring energy production of each panel will e.g. give an operator an early indication regarding need for panel cleaning and maintenance, resulting in better utilization. Typically, the central adaptation unit comprises an inductor for taking up inevitable voltage mismatch between the DC-AC inverter and the grid.

Previously mentioned converter types such as string converters, power optimizers and microinverters generally have an efficiency of 95-98%, whereas the present invention utilizing a cascaded H-bridge converter has an efficiency of about 99%. Advantageously, costly heat sinks can hence be avoided due to the extremely low power dissipation.

In an embodiment of the present invention, each H-bridge converter is connected to the central adaptation unit via a two-conductor cable comprising a communication channel via which control signals are transferred from the central adaptation unit and a power transfer path via which the output of each H-bridge converter is transferred to central adaptation unit, said central adaptation unit being arranged to adapt the multilevel voltage output such that an AC grid voltage is output from the DC-AC inverter.

In an alternative embodiment of the present invention, the communication channel via which each H-bridge converter and the central adaptation unit is connected is wireless.

In a further embodiment of the present invention, each one of the H-bridge converters further comprises a switch at its input which can be selectably operated to connect and disconnect the H-bridge converter from the photovoltaic element.

In a cascaded H-bridge converter the sum of output of the respective H-bridge must be greater than the required magnitude of the ultimately produced grid AC voltage. In the case of cascaded H-bridge converters used with PV panels, the overall DC voltage produced by the panels must be significantly higher than the required AC voltage magnitude to account for shadowed and malfunctioning panels, which decreases the efficiency. Further, the redundancy provided by this over dimensioned DC voltage capacity may still be insufficient in the case of too many shadowed or malfunctioning panels. The shading is typically caused by objects such as trees, buildings or chimneys and is particularly common for PV panel installations in residential areas. It should be noted that the output voltage of a cascaded H-bridge converter is dictated by the respective output voltage level of the individual H-bridges in the cascade chain. As a result, should one PV panel be shaded such that its corresponding integrated DC-AC inverter produces only a small—or in worst case zero-voltage, the output voltage of the entire cascaded H-bridge will be affected, as the shaded PV panel only make a small contribution (if any) to the DC-AC inverter output voltage, which is highly undesirable and ultimately can lead to a situation where sufficient AC grid voltage cannot be provided.

In this particular embodiment, capacitive storage, i.e. a capacitor, in the H-bridge can be active in producing a required output voltage even though the PV panel is disconnected. This advantageously increases redundancy and fault tolerance of a PV plant with a very small increase in cost; only a further switch (e.g. a MOSFET) is required for each H-bridge. In case of shading, power must be transferred to the capacitive storage of the disconnected H-bridge from remaining functioning panels and H-bridges such that required voltage level is reached by the plurality of cascaded H-bridges.

In a further embodiment, each H-bridge is arranged with an individual microcontroller for controlling the switching of the H-bridge. Further, each one of the plurality of H-bridge converters and the respective individual microcontroller is mounted on a printed circuit board (PCB) arranged to be integrated with the corresponding photovoltaic element, and the central adaptation unit is arranged remotely from the printed circuit boards. The printed circuit board is referred to in the following as a submodule. This will greatly facilitate the integration of a DC-AC inverter with a PV panel; a microcontroller adds a great deal of intelligence to each submodule.

Each submodule typically consists of a PCB on which four MOSFETs (five in case a disconnection switch is utilized), one or more capacitors and a microcontroller are mounted. Optionally, communication circuitry may be implemented on the PCB. Due to the low power dissipation, the submodules can be mounted in an airtight, weather proof, injection moulded plastic housing.

In yet another embodiment of the present invention, each printed circuit board (i.e. each submodule) is arranged in a junction box of the corresponding photovoltaic element. By integrating the submodules into the junction boxes of the PV panels, the DC cabling found in PV installations using non-integrated DC-AC inverters can be avoided. The omission of DC cables and connectors is significantly advantageous as cables and connectors are costly and also subject to special installation and safety regulations, e.g. DC rated circuit breakers that are installed to isolate the respective PV panel in case of fires etc. Further, by integrating the submodules in the PV panel junction boxes, safety disconnect functionality can be achieved without additional cost. Cabling faults can be individually sensed by the submodules and the panel voltage can be disconnected from the cabling instantaneously. This makes the installation inherently safer than PV installations using non-integrated DC-AC inverters. Moreover, a number of features of the respective PV panel can easily and straightforwardly be measured, e.g. general panel performance, energy harvest parameters, panel temperature, etc. In addition, the integration of the submodules in the junction boxes decreases overall manufacturing and installation costs.

In a further embodiment of the present invention, module-level maximum power point tracking (MPPT) is provided. The current-voltage characteristic of a PV panel is nonlinear. Along this curve, a maximum output power of the PV panel can be found for a certain current and a certain voltage level. Thus, the panel will deliver a maximum (or at least near-maximum) output power when the voltage over the H-bridge capacitor is at a certain level. Current from the PV panel will continuously charge the capacitor, while the current flowing through the H-bridge output terminals can charge or discharge the capacitor depending on the state of the switching elements of the H-bridge. When a positive voltage is inserted by the H-bridge a positive current flowing through the H-bridge output terminals will charge the capacitor while a negative current will discharge it. When a negative voltage is inserted the opposite is true. By selecting at which intervals a nonzero voltage is inserted into the cascade in synchronism with the grid AC current, e.g. by sinusoidal pulse width modulation, the capacitor voltage can be controlled to be optimal from an output power point of view.

Further features of, and advantages with, the present invention will become apparent when studying the appended claims and the following description. Those skilled in the art realize that different features of the present invention can be combined to create embodiments other than those described in the following. Throughout the description, PV elements, PV panels and solar panels are interchangeably used to denote the same type of photovoltaic element.

BRIEF DESCRIPTION OF THE DRAWINGS

The invention will now be described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

Figure 1:
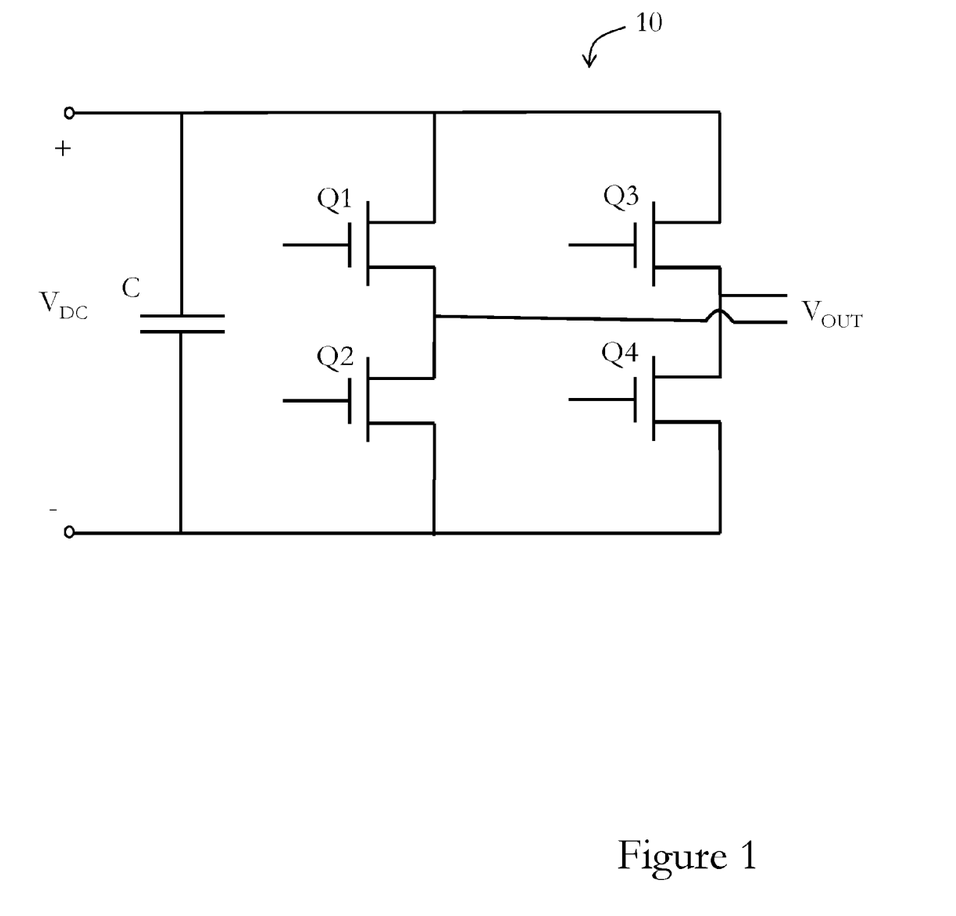
FIG. 1 shows an H-bridge converter used in embodiments of the present invention.

FIG. 1 shows an H-bridge converter as will be used in embodiments of the present invention. Typically, the switching elements of the H-bridge converter 10 are embodied in the form of four metal oxide semiconductor field effect transistors (MOSFETs) Q1, Q2, Q3 and Q4, but any other appropriate switching element can be used. A cascaded H-bridge converter consists of a number of full-bridge converters 10 connected in cascade, each with a separate DC-link capacitor C. A converter fed with a DC voltage $V_{DC}$ is able to produce a 3-level output consisting of the voltage levels $+V_{DC}$, zero and $-V_{DC}$. In the present invention, the DC voltage is supplied by a PV panel. The output of each converter is added such that a multilevel output ($V_{OUT}$) is formed. A circuit consisting of N cascaded H-bridge converters can produce a voltage waveform with 2N+1 voltage levels. This particular topology has four different states that are used for producing a multilevel voltage output:

| Q1 | Q2 | Q3 | Q4 | $V_{OUT}$ |
|---|---|---|---|---|
| Closed | Open | Open | Closed | $+V_{DC}$ |
| Open | Closed | Closed | Open | $-V_{DC}$ |
| Open | Open | Closed | Closed | 0 |
| Closed | Closed | Open | Open | 0 |

The MOSFETs are controlled by applying a control voltage on the gate of the respective MOSFET. The switch control circuitry that applies the control voltage to the respective gate is in an embodiment of the present invention implemented in the form of a microcontroller. The microcontroller is mounted on a printed circuit board along with the H-bridge converter and integrated in a junction box of the respective PV panel.

Figure 2A:
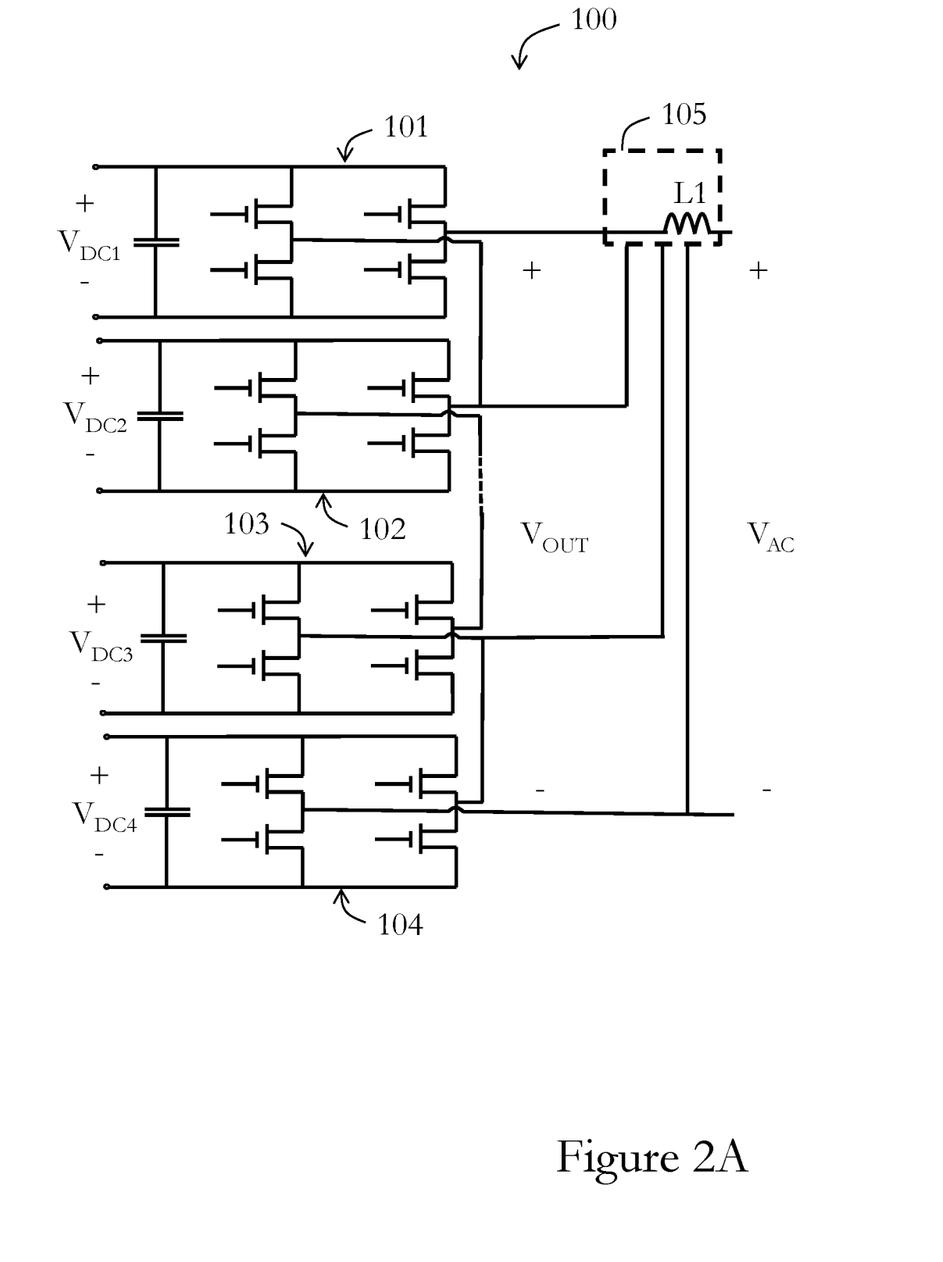
FIG. 2A shows a DC-AC inverter according to an embodiment of the present invention.
Figure 2B:
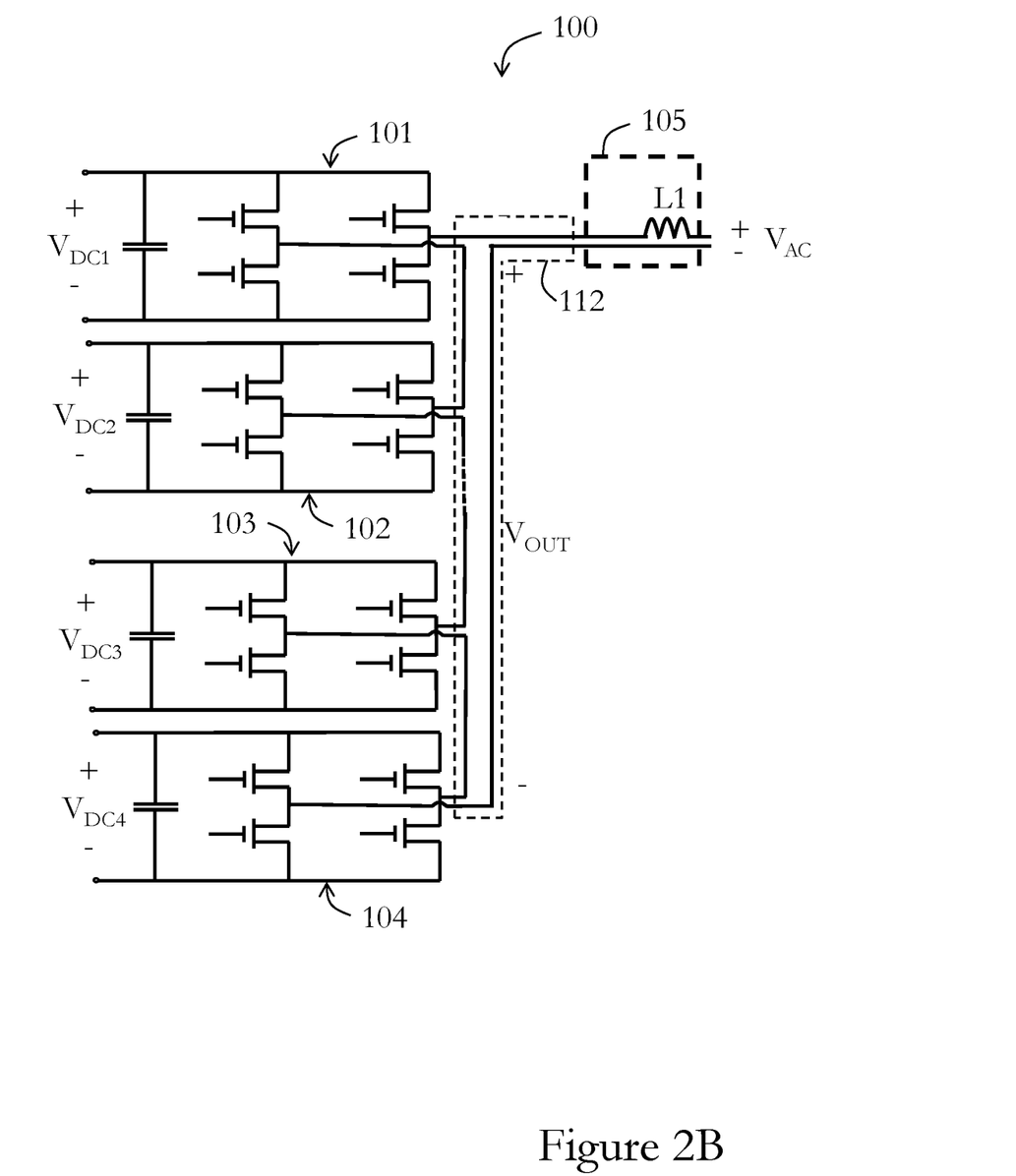
FIG. 2B shows a DC-AC inverter according to an additional embodiment of the present invention.

FIG. 2A shows a DC-AC inverter according to an embodiment of the present invention. The DC-AC inverter 100 comprises a plurality of H-bridge converters 101, 102, 103, 104, each being arranged to be integrated with a respective photovoltaic element and to be supplied with a DC voltage $V_{DC_1}$, $V_{DC_2}$, $V_{DC_3}$, $V_{DC_4}$ from the photovoltaic element, the H-bridge converters further being cascaded to produce a multilevel voltage output ($V_{OUT}$). The number of H-bridge converters to be cascaded depends on the number of PV elements to be used. As an example, a four-stage H-bridge converter is capable of producing a 9-level voltage output. Further, DC-AC inverter comprises switch control circuitry (not shown in FIG. 2) connected to each one of the plurality of H-bridge converters to control switching thereof for producing the multilevel voltage output. Further, the DC-AC inverter comprises a central adaptation unit 105 connected to the cascaded H-bridge converter for adapting the multilevel voltage output such that an AC grid voltage ($V_{AC}$) is output from the DC-AC inverter. In its simplest form, the central adaptation unit is realized by means of an inductor L1 for taking up inevitable voltage mismatch between the DC-AC inverter and the grid. The central adaptation unit is typically remotely located from the PV panels, for instance at a central supervision capacity. FIG. 2B shows a DC-AC inverter according to an additional embodiment of the present invention. FIG. 2B is similar to FIG. 2A, however in FIG. 2B, each H-bridge converter 101, 102, 103, 104 is connected to the central adaptation unit 105 via a two-conductor cable 112 comprising a communication channel via which control signals are transferred from the central adaptation unit 105 and a power transfer path via which the output of each H-bridge converter 101, 102, 103, 104 is transferred to central adaptation unit 105, said central adaptation unit 105 being arranged to adapt the multilevel voltage output such that an AC grid voltage is output from the DC-AC inverter.

Figure 3:
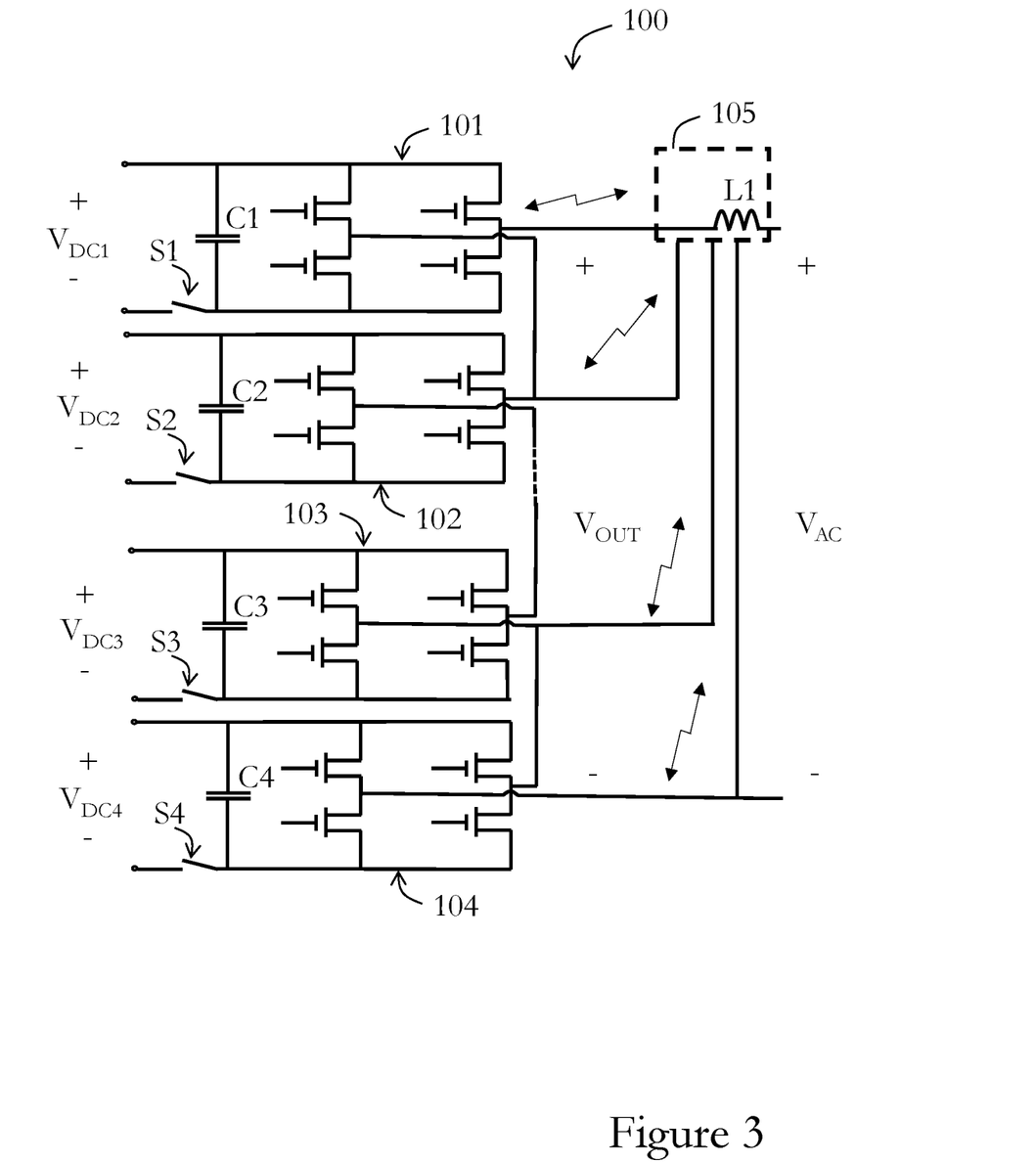
FIG. 3 shows a DC-AC inverter according to another embodiment of the present invention.

FIG. 3 shows a DC-AC inverter according to another embodiment of the present invention. In addition to the embodiment shown in FIG. 2, a switch S1, S2, S3, S4 is arranged at the input of the respective H-bridge converter 101, 102, 103, 104. The switch can be selectably operated to connect and disconnect the H-bridge converter from the PV panel. The switch is typically operated by the microcontroller which is mounted on a printed circuit board along with the H-bridge converter, and which also controls switching of the MOSFETs. Further, the switch S1, S2, S3, S4 may be embodied in the form of a MOSFET or any other appropriate switching device. The capacitor C1, C2, C3, C4 of the respective H-bridge 101, 102, 103, 104 can be active in producing a required output voltage even though the PV panel is disconnected, i.e. the voltage input to the disconnected H-bridge is zero. As previously has been discussed, a need to disconnect shaded PV panels may arise, in which case power must be transferred to the capacitor of the disconnected H-bridge from remaining functioning panels and H-bridges such that required voltage level $V_{OUT}$, (and subsequently $V_{AC}$) is reached by the plurality of cascaded H-bridges. For example, assuming that switch S2 is open and H-bridge 102 thus is disconnected from its PV panel, H-bridge 102 can still be provided with sufficient power from the other PV panels via the cascade connection to H-bridges 101, 103, 104.

Figure 4:
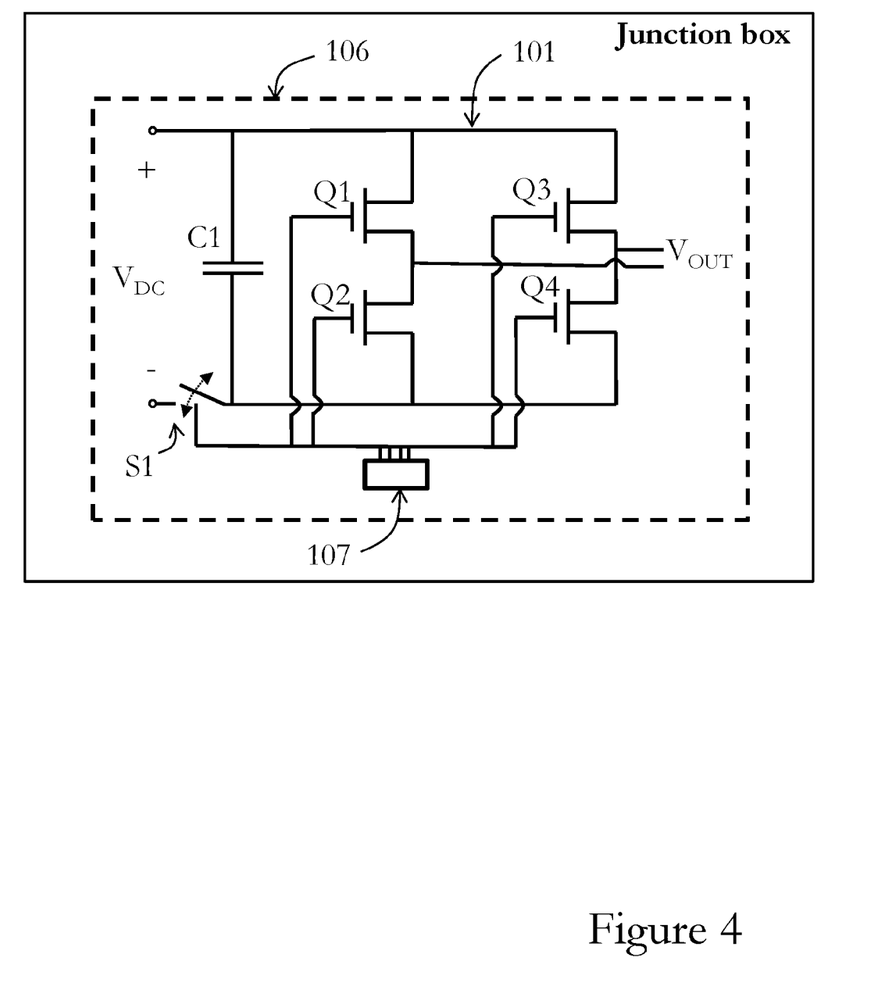
FIG. 4 shows still another embodiment of the present invention.

With reference to FIG. 4, in still another embodiment of the present invention, each H-bridge 101 comprising MOSFETs Q1, Q2, Q3, Q4 and capacitor C1 is mounted on a PCB 106 along with the switch S1 and the microcontroller 107 which operates the MOSFETs and the switch S1. The printed circuit board is integrated with its corresponding panel such that DC wiring and cables can be omitted. In an embodiment, the PCB is integrated in the junction box of the PV panel. To create the cascaded H-bridge converter of the present invention, the plurality of PCBs carrying the H-bridges are connected in cascade.

Figure 5:
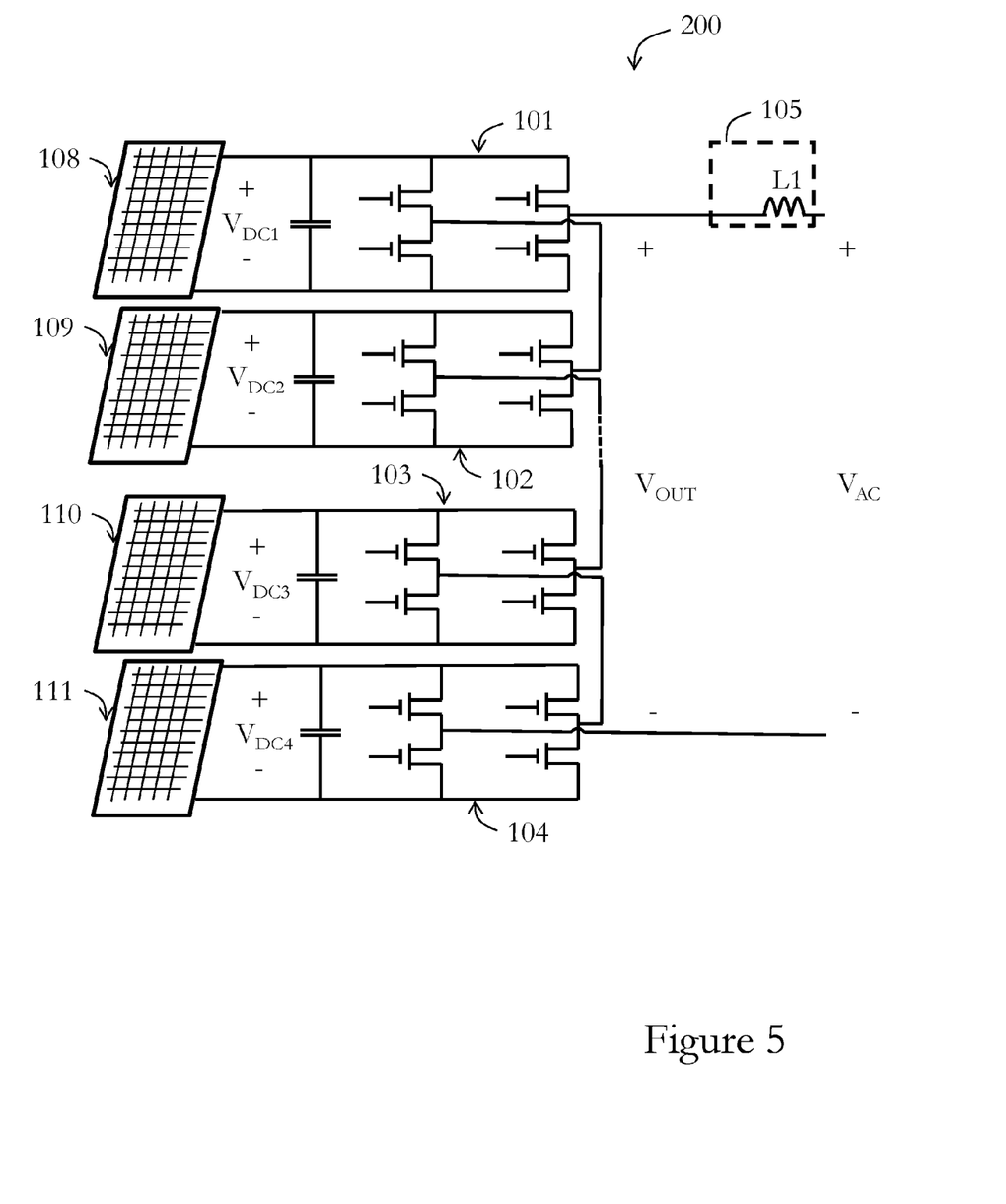
FIG. 5 shows a complete photovoltaic system according to a further aspect of the present invention.

FIG. 5 shows a further aspect of the present invention, in which a complete photovoltaic system is provided. The photovoltaic system 200 comprises a plurality of PV panels 108, 109, 110, 111. With each PV panel, a respective H-bridge converter 101, 102, 103, 104 is integrated, preferably in the junction box of the respective panel. Each H-bridge converter is supplied with a DC voltage VDC1, VDC2, VDC3, VDC4 from the PV panels. The H-bridge converters are further cascaded to produce a multilevel voltage output VOUT, Further, DC-AC inverter comprises switch control circuitry (typically embodied in the form of microcontrollers) as previously described to control switching thereof for producing the multilevel voltage output. Further, the PV system 200 comprises a central adaptation unit 105 connected to the cascaded H-bridge converter for adapting the multilevel voltage output such that an AC grid voltage VAC is output from the system. In its simplest form, the central adaptation unit is realized by means of an inductor L1 for taking up inevitable voltage mismatch between the system and the grid. The central adaptation unit is typically remotely located from the PV panels, for instance at a central supervision capacity. The PV system may comprise switches as discussed hereinabove for disconnecting an H-bridge from its PV panel in case of shading.

It is to be noted that the central adaptation unit 105 as has been discussed hereinabove in embodiments of the present invention may comprise more intelligence than an inductance. For instance, the central unit may comprise a microcontroller for communicating with the respective PCB, either via a wired or wireless communication channel. It may further or alternatively comprise earth fault breaker(s) and other safety components such as anti-islanding circuitry. Further, the central adaptation unit may comprise current and voltage measurement circuitry for performing system diagnostics.

What is claimed is:

1. A DC-AC inverter (100) comprising:
   a plurality of H-bridge converters (101, 102, 103, 104), each being arranged to be integrated with a respective photovoltaic element and to be supplied with a DC voltage ($V_{DC1}$, $V_{DC2}$, $V_{DC3}$, $V_{DC4}$) from the photovoltaic element, the H-bridge converters further being cascaded to produce a multilevel voltage output ($V_{OUT}$);
   switch control circuitry (107) connected to each one of the plurality of cascaded H-bridge converters to control switching thereof for producing said multilevel voltage output; and
   a central adaptation unit (105) connected to each one of the cascaded H-bridge converters, via a communications channel via which control signals are transferred from the central adaptation unit to each respective H-bridge converter, and connected to the switch control circuitry, for adapting the multilevel voltage output such that an AC grid voltage ($V_{AC}$) is output from the DC-AC inverter, the DC-AC inverter being characterized in that:
   each one of the H-bridge converters (101, 102, 103, 104) further comprises:
     a switch (S1, S2, S3, S4) arranged at its input which can be selectably operated to connect and disconnect the H-bridge converter from the photovoltaic element; and
     a capacitive storage (C1, C2, C3, C4) arranged to produce, from power transferred to the capacitive storage from remaining connected H-bridge converters, a required output voltage for the respective H-bridge converter when said respective H-bridge converter is disconnected, by the switch operated by the switch control circuitry based on control signals from the central adaptation unit, from its photovoltaic element.

2. The DC-AC inverter (100) according to claim 1, wherein each H-bridge converter (101, 102, 103, 104) is connected to the central adaptation unit (105), via a power transfer path via which the multilevel voltage output ($V_{OUT}$) of the cascaded H-bridge converter is transferred to the central unit.

3. The DC-AC inverter (100) according to claim 1, wherein each H-bridge converter (101, 102, 103, 104) is connected to the central adaptation unit (105), via a two-conductor cable comprising the communication channel via which the control signals are transferred from the central unit to each respective H-bridge converter, and a power transfer path via which the multilevel voltage output ($V_{OUT}$) of the cascaded H-bridge converter is transferred to the central unit.

4. The DC-AC inverter (100) according to claim 1, wherein said communication channel is wireless.

5. The DC-AC inverter (100) according to claim 1, wherein the switch control circuitry is a microcontroller (107), and each H-bridge converter (101) is arranged with an individual microcontroller for controlling switching thereof.

6. The DC-AC inverter (100) according to claim 5, wherein each one of the plurality of H-bridge converters (101) and the respective individual microcontroller (107) is mounted on a printed circuit board (106) arranged to be integrated with the corresponding photovoltaic element, and the central adaptation unit (105) is arranged remotely from the printed circuit boards.

7. The DC-AC inverter (100) according to claim 5, wherein each printed circuit board (106) is arranged in a junction box of the corresponding photovoltaic element.

8. The DC-AC inverter (100) according to claim 1, wherein the central adaptation unit (105) comprises an inductor (L1) connected to the cascaded H-bridge converter for adapting the multilevel voltage output such that an AC grid voltage ($V_{AC}$) is output from the DC-AC inverter.

9. A photovoltaic system (200) comprising:
   a plurality of photovoltaic elements (108, 109, 110, 111);
   a DC-AC inverter comprising:
     a plurality of H-bridge converters (101, 102, 103, 104), each being arranged to be integrated with a respective one of the plurality of photovoltaic element and to be supplied with a DC voltage ($V_{DC1}$, $V_{DC2}$, $V_{DC3}$, $V_{DC4}$) from said respective photovoltaic element, the H-bridge converters further being cascaded to produce a multilevel voltage output ($V_{OUT}$);
     switch control circuitry (107) connected to each one of the plurality of cascaded H-bridge converters to control switching thereof for producing said multilevel voltage output; and
     a central adaptation unit (105) connected to each one of the cascaded H-bridge converters, via a communications channel via which control signals are transferred from the central adaptation unit to each respective H-bridge converter, and connected to the switch control circuitry, for adapting the multilevel voltage output such that an AC grid voltage ($V_{AC}$) is output from the DC-AC inverter, the photovoltaic system being characterized in that
   each one of the H-bridge converters (101, 102, 103, 104) further comprises:
     a switch (S1, S2, S3, S4) arranged at its input which can be selectably operated to connect and disconnect the H-bridge converter from the photovoltaic element; and
     a capacitive storage (C1, C2, C3, C4) arranged to produce, from power transferred from remaining connected H-bridge converters, a required output voltage for the respective H-bridge converter when said respective H-bridge converter is disconnected by the switch operated by the switch control circuitry based on control signals from the central adaptation unit, from its photovoltaic element.

10. The photovoltaic system (200) according to claim 9, wherein each H-bridge converter (101, 102, 103, 104) is connected to the central adaptation unit (105), via a power transfer path via which the multilevel voltage output ($V_{OUT}$) of the cascaded H-bridge converter is transferred to the central unit.

11. The photovoltaic system (200) according to claim 9, wherein each H-bridge converter (101, 102, 103, 104) is connected to the central adaptation unit (105), via a two-conductor cable comprising the communication channel via which the control signals are transferred from the central unit to each respective H-bridge converter, and a power transfer path via which the multilevel voltage output ($V_{OUT}$) of the cascaded H-bridge converter is transferred to the central unit.

12. The photovoltaic system (200) according to claim 9, wherein said communication channel is wireless.

13. The photovoltaic system (200) according to claim 9, wherein the switch control circuitry is a microcontroller (107), and each H-bridge converter (101) is arranged with an individual microcontroller for controlling switching thereof.

14. The photovoltaic system (200) according to claim 13, wherein each one of the plurality of H-bridge converters (101) and the respective individual microcontroller (107) is mounted on a printed circuit board (106) arranged to be integrated with the corresponding photovoltaic element, and the central adaptation unit (105) is arranged remotely from the printed circuit boards.

15. The photovoltaic system (200) according to claim 13, wherein each printed circuit board (106) is arranged in a junction box of the corresponding photovoltaic element.

16. The photovoltaic system (200) according to claim 9, wherein the central adaptation unit (105) comprises an inductor (L1) connected to the cascaded H-bridge converter for adapting the multilevel voltage output such that an AC grid voltage ($V_{AC}$) is output from the DC-AC inverter.

\* \* \* \* \*